US005464594A

United States Patent [19]
Leung et al.

[11] Patent Number: 5,464,594
[45] Date of Patent: * Nov. 7, 1995

[54] CERAMIC FIBER REINFORCED SILICON CARBOXIDE COMPOSITE

[75] Inventors: Roger Y. Leung, Schaumburg; Stephen T. Gonczy, Prospect, both of Ill.

[73] Assignee: AlliedSignal Inc., Morris Township, Morris County, N.J.

[ * ] Notice: The portion of the term of this patent subsequent to Jun. 7, 2011, has been disclaimed.

[21] Appl. No.: 638,107

[22] Filed: Dec. 20, 1990

Related U.S. Application Data

[62] Division of Ser. No. 426,820, Oct. 25, 1989.

[51] Int. Cl.$^6$ .............................. D04H 1/58; B32B 9/00
[52] U.S. Cl. .................... 422/288; 428/367; 428/408; 428/902; 501/32; 501/35; 501/54
[58] Field of Search ................................ 428/113, 251, 428/266, 268, 288, 367, 408, 902; 501/32, 54

[56] References Cited

U.S. PATENT DOCUMENTS

| | | | |
|---|---|---|---|
| 3,944,519 | 3/1976 | Mink et al. | 260/46.5 UA |
| 4,234,713 | 11/1980 | LeGrow | 528/15 |
| 4,460,638 | 7/1984 | Haluska | 428/224 |
| 4,460,639 | 7/1984 | Chi et al. | 428/224 |
| 4,460,640 | 7/1984 | Chi et al. | 428/224 |
| 4,618,522 | 10/1986 | Modic | 428/145 |
| 4,888,235 | 12/1989 | Chenoweth et al. | 428/283 |
| 5,180,694 | 1/1993 | Renlund et al. | 501/12 |
| 5,242,866 | 9/1993 | Leung et al. | 501/12 |

FOREIGN PATENT DOCUMENTS

WO93/14040  7/1993  WIPO.

OTHER PUBLICATIONS

Prewo et al., Ceramic Bulletin, vol. 65, No. 2 (1986).
U.S. Ser. No. 002,049 filed on Jan. 9, 1987 for Leung et al.

*Primary Examiner*—Ngoclan Mai
*Attorney, Agent, or Firm*—Harold N. Wells; Roger H. Criss

[57] ABSTRACT

An improved fiber reinforced glass composite includes refractory fiber in a matrix of a black glass ceramic having the empirical formula $SiC_xO_y$ where x ranges from about 0.5 to about 2.0, preferably 0.9 to 1.6 and y ranges from about 0.5 to 3.0, preferably 0.7 to 1.8. Preferably the black glass ceramic is derived from cyclosiloxane monomers containing a vinyl group attached to silicon and/or a hydride-silicon group.

11 Claims, No Drawings

CERAMIC FIBER REINFORCED SILICON CARBOXIDE COMPOSITE

This application is a division, of application Ser. No. 07/426,820, filed Oct. 25, 1989, pending.

PRIOR ART

The invention relates generally to composite laminates in which a matrix material is reinforced with fibers. Such laminates are widely used for various purposes, but they are not generally applicable in situations where high temperatures are expected. However, the present invention relates to ceramic fiber-glass composites having application at temperatures which would destroy conventional polymeric materials.

Matrices having enhanced performance have been suggested for use with fibers having high strength at elevated temperatures. Examples of such matrix materials are the glass and glass ceramics (Prewo et al., Ceramic Bulletin, Vol. 65, No. 2, 1986).

In U.S. Ser. No. 002,049 a ceramic composition designated "black glass" is disclosed which has an empirical formula SiCxOy where x ranges from about 0.5 to about 2.0 and y ranges from about 0.5 to about 3.0, preferably x ranges from 0.9 to 1.6 and y ranges from 0.7– 1.8. Such a ceramic material has a higher carbon content than prior art materials and is very resistant to high temperatures— up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. The present invention involves the application of such black glass to reinforcing fibers to form laminates very useful in high temperature applications.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesqulloxane, as described in U.S. Pat. No. 4,460,639. However, such materials are hydrolyzed and since they release alcohols and contain excess water and must be carefully dried to avoid fissures in the curing process.

Another U.S. Pat. No. 4,460,640, disclosed related fiber reinforced glass composites using organopolysiloxane resins of U.S. Pat. No. 3,944,519 and U.S. Pat. No. 4,234,713 which employ crosslinking by the reaction of ≡SiH groups to $CH_2$=CHSi≡ groups. These later two patents have in common the use of organosilsesquioxanes having $C_6H_5SiO_{3/2}$ units, which have been considered necessary by the patentees to achieve a flowable resin capable of forming a laminate. A disadvantage of such $C_6H_5SiO_{3/2}$ units is their tendency to produce free carbon when pyrolyzed. As will be seen, the present invention requires no such $C_6H_5SiO_{3/2}$ units, and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. As will be seen, the present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 patent is that they require a partial curing step before pressing and final curing. This operation is difficult to carry out and may prevent satisfactory lamination if the polymer is over cured. The present invention can be carried out after coating the fibers and requires no pre-curing step.

SUMMARY OF THE INVENTION

An improved fiber reinforced glass composite of the invention comprises (a) at least one refractory fiber selected from the group consisting of boron, silicon carbide, graphite, silica, quartz, S-glass, E-glass, alumina, alumina silicate, boron nitride, silicon nitride, boron carbide, titanium boride, titanium carbide, zirconium oxide, and zirconium-toughened alumina and, (b) a carbon-containing black glass ceramic composition having the empirical formula SiCxOy where x ranges from about 0.5 to about 2.0, preferably from 0.9 to 1.6, and y ranges from about 0.5 to about 3.0, preferably from 0.7 to 1.8.

In a preferred embodiment, the black glass ceramic composition (b) of the invention is the pyrolyzed reaction product of a polymer prepared from (1) a cyclosiloxane monomer having the formula

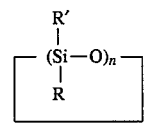

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, said polymerization reaction taking place in the presence of an effective amount of hydrosilylation catalyst. The polymer product is pyrolyzed in a non-oxidizing atmosphere to a temperature in the range of about 800° C. to about 1400° C. to produce the black glass ceramic.

In another embodiment the invention comprises a method of preparing a fiber reinforced glass composite wherein the cyclosiloxane reaction product described above is combined with refractory fibers in the form of woven fabric or unidirectionally aligned. Plies of the coated fibers are laid-up to form a green laminate and thereafter pyrolyzed in a non-oxidizing atmosphere at a temperature between about 800° C. and about 1400° C., preferably about 850° C., to form the black glass composite. The laminate may be reimpregnated with polymer solution and repyrolyzed in order to increase density.

DETAILED DESCRIPTION OF THE PREFERRED EMBODIMENTS BLACK GLASS CERAMIC

The black glass ceramic used as the matrix has an empirical formula SiCxOy wherein x ranges from about 0.5 to about 2.0, preferably 0.9–1.6, and y ranges from about 0.5 to about 3.0, preferably 0.7–1.8, whereby the carbon content ranges from about 10% to about 40% by weight. The black glass ceramic is the product of the pyrolysis in a non-oxidizing atmosphere at temperatures between about 800° C. and about 1400° C. of a polymer made from certain siloxane monomers.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. When the polymer is placed in a non-oxidizing atmosphere, such as nitrogen, and pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

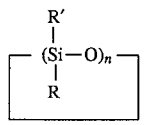

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-, 1,3,5,7-tetrahydrocyclotetrasiloxane. Alternatively, two or more cyclosiloxane monomers may be polymerized. Such monomers would contain either a silicon hydride bond or a silicon-vinyl bond and the ratio of the two types of bonds should be about 1:1, more broadly about 1:9 to 9:1.

Examples of such cyclosiloxanes include, but are not limited to:
1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane
1,3,5,7-tetrapropertyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent. Resin used in impregnating fibers to form prepreg in our invention preferably is prepared by solution polymerization. The advantage of solution polymerization is the ease of controlling resin characteristics. In the present invention, soluble resin with the desirable viscosity, tackiness, and flowability suitable for prepregging and laminating can be obtained consistently using solution polymerization process. The production of easily handleable and consistent resin is very critical in composite fabrication. It is very difficult to produce B-stage resin suitable for prepregs with consistent characteristics by bulk polymerization.

Fibers

Reinforcing fibers useful in the composites of the invention are refractory fibers which are of interest for applications where superior physical properties are needed. They include such materials as boron, silicon carbide, graphite, silica, quartz, S-glass, E-glass, alumina, aluminosilicate glasses, boron nitride, silicon nitride, boron carbide, titanium boride, titanium carbide, zirconium oxide, and zirconium-toughened alumina.

The fibers may have various sizes and forms. They may be monofilaments from 1 μm to 200 μm diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. Consequently, the fibers may be treated to provide the type of bonding desired, which may not necessarily be stronger than the matrix or the fiber itself. The surface deposits found on fibers as received or produced may be removed by solvent washing or heat treatment and the desired bonding agent applied by solution coating or vapor deposition.

Processing

As previously discussed, the black glass precursor is a polymer. It may be shaped into fibers or may be used in solution for coating or impregnating other fibers. Thus various methods will suggest themselves to those skilled in the art for combining the black glass precursor with reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating could be done by dipping, spraying, brushing, or the like.

Two methods of particular usefulness may be described. In the first method, a continuous fiber is coated with a solution of the black glass precursor polymer and then wound on a rotating drum covered with a release film which is easily separated from the coated fibers. After sufficient fiber has been built up on the drum, the process is stopped and the uni-directional fiber mat removed from the drum and dried. The resulting mat (i.e., "prepreg") then may be cut and laminated into the desired shapes.

In the second method, a woven or pressed fabric of the reinforcing fibers is coated with a solution of the black glass precursor polymer and then dried, after which it may be formed into the desired shapes by procedures which are familiar to those skilled in the art of fabricating structures with the prepreg sheets. For example, layers of prepreg sheets may be laid together and pressed into the needed shape. The orientation of the fibers may be chosen to strengthen the composite part in the principal load-bearing directions.

Solvents for the black glass precursor polymers include aromatic hydrocarbons, such as toluene, benzene, and xylene, and ethers, such as tetrahydrofuran, etc. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

Our resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. Our resins can be controlled to provide the desired tackiness and viscosity in the prepreg for the lay-up procedures.

After the initial forming, the composites may be consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. in an inert atmosphere (pyrolysis) converts the polymer into a black glass ceramic containing essentially only carbon, silicon, and oxygen. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70–80% of its theoretical density.

Conversion of the polymer to black glass takes place between 430° C. and 950° C. Three major pyrolysis steps were identified by thermogravimetric analysis at 430° C.–700° C., 680° C.–800° C. and 780° C.–950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure still retains voids, the structure may be increased in density by impregnating with a neat monomer liquid or solution of the black glass precursor polymer. The solution is then gelled by heating to about 50° C.–120° C. for a sufficient period of time. Following gelation, the polymer is pyrolyzed as described above. Repeating these steps, it is feasible to increase the density to about 95% of the theoretical.

The above procedures will be illustrated in more detail in the examples below. Examples 1–6 describe the procedures used to prepare fiber reinforced black glass laminates, while Examples 7–11 illustrate the properties of such laminates.

EXAMPLE 1

Polymer Precursor Preparation

The cyclosiloxane having silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A volume ratio of 59 ViSi/41 HSi was mixed with 22 wt. ppm of platinum as a platinum-cyclovinylmethylsiloxane complex in toluene to give a 10 vol. percent solution of the cyclosiloxane monomers. The solution was heated to reflux conditions (about 110° C.) and refluxed for about 2 hours. Then, the solution was concentrated in a rotary evaporator at 50° C. to a 23% concentration suitable for use in prepregging. The resin produced was poly(methylmethylenecyclosiloxane) (PMMCS). It was hard and dry at room temperature, but it was flowable at temperatures of about 70° C. or higher and thus suitable for use as a B stage resin.

EXAMPLE 2

Prepregging

An apparatus was set up for coating fibers with the PMMCS polymer and winding them on a rotating drum covered with a sheet of prepreg release film. The apparatus employed three pulleys to carry the fibers and to lay the fibers uniformly and to produce no gaps nor undesired overlapped fibers. The middle pulley was immersed in the polymer resin solution so the fiber pulled through it would be coated with the resin. After the amount of fiber needed was spun onto the drum, the drum was left to rotate so that the resin would dry uniformly throughout the prepreg. After the prepreg was dry enough to handle, it was removed from the drum and dried for 12 hours at 23° C. The length of the prepreg was 1448 mm, the same as the circumference of the drum. The width depended on how much fiber was spun onto the drum (max. of 406 mm). Prepregs were made from various continuous fibers including Nicalon®(a), PRD-166®(b), Nextel-480®(c), and carbon. Resin content in the prepregs were usually between about 20 to 45 wt. % with a fiber areal weight of about 250 to 600 gm/m$^2$.

(a) Nicalon® is a silicon carbide fiber from Dow Corning.

(b) PRD-166® is a zirconia-toughened alumina fiber from DuPont.

(c) Nextel-480® is an alumina-silica-boria fiber by 3M.

EXAMPLE 3

Lay-Up

After the prepreg of Example 2 was dried, it was cut into plies with the shapes and fiber orientation required for the component to be made. The thickness of the component was built by laying up a number of plies together. Vacuum compaction was used to press the plies together. The first ply was placed in the mold and then additional plies were added to the preceding plies by applying a vacuum.

EXAMPLE 4

Autoclave Curing

Laminates prepared in Example 3 were consolidated by autoclave curing in a vacuum bag. The uncured piece was bagged and vacuum was pulled on the bag while the whole bag was subjected in 689.5 kPa (gauge) gas pressure. The full curing cycle under 689.5 kPa (gauge) of gas pressure was as follows:

(a) heat at 3° C./min to 65° C., (b) hold at 65° C. for 30 minutes, (c) heat to 150° C.–200° C. at 3° C./min, (d) dwell at 150° C.–200° C. for ½ to 2 hours, and (e) slow cool to 50° C.

After autoclave curing, a fiber reinforced green laminate was obtained. Bleeding of resin during autoclave curing was less than 1.0%. The consolidated green laminate can be further hardened by post curing at 200° C. for 2–4 hours, but may be omitted if the green laminate is sufficiently rigid for further processing.

EXAMPLE 5

Pyrolysis

The cured laminates of Example 4 were pyrolyzed in an atmosphere-controlled furnace to convert them to black glass composites. The pyrolyzation cycle was as follows:

(a) increase temperature from 20° C. to the maximum of 850° C.–1200° C. over 8–12 hours, (b) hold at the maximum temperature for 1 to 2 hours, and (c) cool from 850° C.–1200° C. to 20° C. over 8–12 hours.

The pyrolysis was carried out in flowing nitrogen at a flowrate of about 1 liter per minute. The as-pyrolyzed samples were about 70– 80% of their theoretical densities. The char yield of the resin was 84% by weight. For the composites, the char yield was 90–95%, depending upon the fiber loading.

EXAMPLE 6

Reimpregnation

Neat monomer solution consisting of poly(vinylmethylcyclosiloxane) and poly(methylhydrocyclosiloxane) in a volume ratio of 59 to 41 without solvent but containing the platinum catalyst as in Example 1 was used for infiltration under vacuum of the as-pyrolyzed porous black glass laminates of Example 5. The impregnated samples may be pressurized to 414–689 kPa (gauge) pressure to force the liquid into the pores of the composites. The impregnated samples were then gelled at 55° C.–85° C. in 3–5 hours. After gelation, the samples were pyrolyzed in flowing nitrogen as in Example 5 to 850° C.–1200° C. to form more black glass to fill the voids in the laminates. Repeating reimpregnations 4 or 5 times increased the density to 90–94% of the theoretical.

The performance of laminates prepared by the methods described in the above examples will be seen in the following examples.

EXAMPLE 7

Dimensional Stability

The dimensional stability during pyrolysis of the green laminates was demonstrated using 152×152×1.1 mm cross ply panels. Three samples were prepared: Samples A and B were 10–20 μm Nicalon®fiber-black glass composites with four plies in 0/45/90/–45 fiber orientation and Sample C was a four-ply 21 μm PRD-166®$^{(b)}$fiber-black glass composite with 0/45/–45/90 configuration. The Nicalon® panel was made from prepreg having an areal weight of 228 gm/m$^2$ and a resin content of 43 wt. % whereas the PRD-166® panel was made from prepreg with an areal weight of 600 gm/m$^2$ and 26 wt. % resin. Holes were drilled at the corners of a 127 mm square on the panels. Distances between the drilled holes were measured within thousandth of an inch by using dimensional stability measurement apparatus. The green pieces were then pyrolyzed as in Example 5 in flowing nitrogen to a maximum temperature of 850° C. in 38 hours with one Nicalon® panel under an added weight equivalent to about 1 kPa and the other two samples without added weight. The char yield was about 95%. The pyrolyzed black glass laminates retained their structural integrity. The distances between the centers of the drilled holes were measured again and compared with the original distances before pyrolysis. The average change in distance for 22 measurements was +0.01%. In absolute terms, the distance changed less than 0.05 mm over a 127 mm distance for both the non-weighted and weighted samples. The drilled holes remained circular in shape. The results demonstrated the dimensional stability of the black glass composites and its near net-shape formability.

EXAMPLE 8

Formability

U Channel Nicalon® fiber-black glass samples were prepared to demonstrate the formability of curved and complex shapes for black glass composites. A male carbon mold with a 3.18 mm radius curvature was used. Eight 101.6×101.6 mm plies were laid up on the carbon mold covering the 3.18 mm curved surface with [0/90] fiber configuration. The lay-up on the mold was autoclave cured in a 200° C. cure cycle as in Example 4. The consolidated piece was removed from the male mold and cut into three U channels of about 38.1 mm long, 31.8 mm wide with a 180° bend having a 3.18 mm radius. Two pieces were pyrolyzed free standing in flowing nitrogen to 850° C. as in Example 5 to form Nicalon®-black glass components. The as-pyrolyzed samples retained their 180° shape without opening up, producing a black glass composite having the same shape as the green pieces. The as-pyrolyzed samples were then reimpregnated four times with a monomers solution through the infiltration/pyrolyzation cycles as in Example 6 to increase the density and strength of the U channels. The 180° bend in the densified black glass composites remained stable during the reimpregnation process. The results showed the formability and stability of complex shapes made of the black glass composites.

EXAMPLE 9

Bend Strength

Unidirectional test bars with 50.8×6.35×3.18 mm dimensions were prepared for four point bend testing at room temperatures and at elevated temperatures in air. Test bars with fibers of Carbon T-650[a], Nicalon®, PRD-166®, and Nextel-480® were made. Both HVR grade Nicalon® with DCC2 sizing (Dow Corning) and standard ceramic grade Nicalon® with sizing M (polyvinyl acetate) were used. 10–12 plies of the respective prepregs were laid up and autoclave cured as described in Example 4. They were then pyrolyzed and densified through repeated reimpregnations as described in Examples 5 and 6. Bend strength was measured in a four point bend on an Instron tester. The cross-head speed was 0.05 cm/min. The span to depth ratio was 14, except the test for ceramic grade Nicalon® where the value of span/depth was 30 and the span was 2.0 inches. The results at room temperature are listed as follows:

| Composite System | Density | Fiber Vol. % | Black Glass-Composite Bend Strength | Unpyrolyzed Polymer Composite Bend Strength |
|---|---|---|---|---|
| PRO-166® | 2.83 gm/mL | 60 | 35 Ksi | 17 Ksi |
| Nicalon® (HVR) | 1.91 gm/mL | 46 | 12 Ksi | 40 Ksi |
| Nicalon® (St.) | 2.12 gm/mL | 52 | 22 Ksi | — |
| Nextel-480® | 2.28 gm/mL | 37 | 14 Ksi | 32 Ksi |

-continued

| Composite System | Density | Fiber Vol. % | Black Glass-Composite Bend Strength | Unpyrolyzed Polymer Composite Bend Strength |
|---|---|---|---|---|
| Carbon T-650 | 1.93 gm/mL | 39 | 21 Ksi | — |

In each case the failure mode was brittle fracture.
High temperature mechanical properties for the PRD-166® composites were measured and listed as follows:

| Temperature | Bend Strength | Elastic Modulus | Failure Strain (%) |
|---|---|---|---|
| 23° C. | 34.3 ± 1.9 Ksi | 17.1 ± 1.1 Msi | 0.24 ± 0.04 |
| 990° C. air | 24.2 ± 1.1 Ksi | 11.7 ± 2.2 Msi | 0.28 ± 0.10 |
| 1200° C. air | 26.4 ± 4.9 Ksi | — | — |
| 1300° C. air | 11.7 ± 1.2 Ksi | — | — |

The bend strengths of the PRD-166®-black glass composites remained in the 25 Ksi range at temperatures up to 1200° C., which is sufficient for secondary structural and heat shield applications. Creep was observed at 1300° C., resulting in the drop in bend strength. The mechanical properties of PRD-166® composite after exposure to 1200° C. in static air for 24 hours were measured at room temperature. The bend strength and elastic modulus were 33 Ksi and 16 Msi, respectively. Thus, they retained about 95% of their original strength.

Examination of the room temperature fracture PRD-166® samples showed fibers bridging the two broken sections. The 990° C. fracture specimens did break totally, but stereomicroscopy showed weak interaction between fiber and matrix with occasional fiber pull-out.

(a) Carbon T-650 is a carbon fiber by Amoco.

EXAMPLE 10

High Temperature Stability

Long term stability of the ceramic fiber reinforced black glass composites were tested at 1300° C. in stagnant air for 260 hours. Three samples of Nicalon®, PRD-166®, and Nextel-480® composites, each weighing about 0.08 grams, were tested. Samples were taken from the 1300° C. furnace about every 24 hours, quench cooled in laboratory air, and weighed. After the weights were recorded, they were placed back in the furnace which remained at 1300° C. Therefore, each weighing step represented a thermal shock treatment. Over the 260 hour period, the samples experienced nine thermal shock treatments. All samples lost about 1% in weight in the initial six hours due to further calcination of black glass from the pyrolysis temperature of 805° C. to the oxidation test temperature of 1300° C. The PRD-166® samples lost another 1% after 260 hours exposure. The weights appeared to be constant after 150 hours. The Nextel-480® samples lost a total of 3.5% in weight. The increase in weight lost, as compared to PRD-166®, may be due to the volatization of 2% boria in the Nextel-480® fiber. The Nicalon® (HVR grade) gained 0.02% weight after 260 hours. Nicalon® samples started to gain slight weight after 100 hours exposure, which is attributed to the oxidation of Nicalon® fiber to form silicon dioxide. It was concluded that the black glass composites show excellent oxidation resistance at 1300° C.

EXAMPLE 11

Flame Resistance

A 1090° C. flame burnthrough test similar to the SAE flame test was performed on black glass composites using Nicalon®, PRD-166®, and Nextel-480® fibers. The samples were four plies Nicalon®-black glass panel [0/45/90/–45], four plies PRD-166® -black glass panel [0/45/–45/90], and four plies Nextel-480® black glass panel [0/90/0/90] of size 152.4×152.4×1.14 mm. They were densified by one cycle of impregnation and pyrolyzation: the Nicalon® panel gained 16% in weight to a density of 1.68 gm/mL; the density of the PRD-166® panel was 2.76 gm/mL after a weight gain of 9%; the density of the Nextel-480® panel was 1.90 gm/mL. The 1090° C. flame burnthrough test was performed on the once-impregnated panels using a burner adjusted to give a 76.2 mm diameter flame. Thermocouples were placed about 3.18 mm above and below the panel to monitor the temperature on the flame side and the unexposed side. The flame was adjusted to give a flame side temperature of 1050° C. The temperature recorded by the thermocouple on the unexposed side was about 330° C. No flame penetration or burnthrough was observed during the 15 minute test period. At the end of the test, the panel was removed and the temperatures of the bottom and the top thermocouples were 1100° C. and 1130° C., respectively. There were no cracks in these cross-ply laminates after the flame test and the laminates retained their physical integrity. The results demonstrated the excellent thermal shock resistance of the cross-ply configuration panel. The cross-ply panels can withstand thermal shock, contain flame, and have dimensional stability.

We claim:

1. A fiber reinforced glass composite comprising
   (a) refractory fibers;
   (b) a carbon-containing black glass ceramic composition having the empirical formula $SiC_xO_y$ wherein x ranges from about 0.5 to about 2.0 and y ranges from about 0.5 to about 3.0.

2. The fiber reinforced glass composite of claim 1 wherein x ranges from 0.9–1.6 and y ranges from 0.7–1.8.

3. The composite of claim 1 wherein said black glass ceramic composition (b) is the pyrolyzed reaction product of (1) a cyclosiloxane monomer having the formula

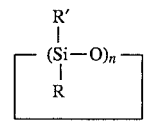

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to about 20 carbon atoms in which one vinyl carbon is directly bonded to silicon and R' is an alkyl group of from 1 to about 20 carbon atoms, said reaction taking place in the presence of an effective amount of hydrosilylation catalyst.

4. The fiber reinforced glass composite of claim 1 wherein the refractory fibers are at least one of said fibers selected from the group consisting of boron, silicon carbide, graphite, quartz, silica, S-glass, E-glass, alumina, alumino silicate, boron nitride, silicon nitride, boron carbide, titanium boride, titanium carbide, zirconium oxide and zirconium-toughened alumina.

5. The fiber reinforced glass composite of claim 4 wherein said refractory fibers are silicon carbide.

6. The fiber reinforced glass composite of claim 4 wherein said refractory fibers are graphite.

7. The fiber reinforced glass composite of claim 4 wherein said refractory fibers are alumina-silica-boria.

8. The fiber reinforced glass composite of claim 4 wherein said refractory fibers are zirconium-toughened alumina.

9. The fiber reinforced glass composite of claim 3 wherein said black glass ceramic composition is the pyrolyzed reaction product of poly(vinylmethylcyclosiloxane) and poly(methyhydrocyclosiloxane).

10. The fiber reinforced glass composite of claim 9 wherein said poly(vinylmethylcyclosiloxane) and poly(methylhydrocyclosiloxane) are the tetramers.

11. The fiber reinforced glass composite of claim 3 where the hydrosilylation catalyst is platinum.

* * * * *